United States Patent [19]
Morse et al.

[11] Patent Number: 6,055,413
[45] Date of Patent: Apr. 25, 2000

[54] SYSTEM AND METHOD FOR INCLUDING ORIGINATION TIME AND UPDATE LIFETIME WITH UPDATEABLE MESSAGES

[75] Inventors: Gary James Morse, Boca Raton; Frederick Loring Kampe, Boynton Beach; Robert Nathan Nelms, Lake Worth; Hagai Ohel, Coconut Creek, all of Fla.; Kenneth Greene, Southlake, Tex.

[73] Assignee: Motorola, Inc., Schaumburg, Ill.

[21] Appl. No.: 09/120,206

[22] Filed: Jul. 21, 1998

[51] Int. Cl.[7] ........................................... H04Q 7/14
[52] U.S. Cl. ..................... 455/38.1; 455/31.2; 455/426; 340/825.44
[58] Field of Search ..................... 455/31.1, 31.2, 455/31.3, 38.1, 426, 458, 414, 418, 419; 340/825.44, 825.26, 825.27, 825.35, 825.49

[56] References Cited

U.S. PATENT DOCUMENTS

| | | | |
|---|---|---|---|
| 4,845,491 | 7/1989 | Fascenda et al. | 340/825.44 |
| 5,025,252 | 6/1991 | DeLuca et al. | 340/825.44 |
| 5,045,848 | 9/1991 | Fascenda | 340/825.26 |
| 5,173,688 | 12/1992 | DeLuca et al. | 340/825.44 |
| 5,241,305 | 8/1993 | Fascenda et al. | 340/825.44 |
| 5,283,832 | 2/1994 | Lockhart et al. | 380/49 |
| 5,295,064 | 3/1994 | Malec et al. | 340/825.35 |
| 5,345,227 | 9/1994 | Fascenda et al. | 340/825.22 |
| 5,426,422 | 6/1995 | Vanden Heuvel et al. | 340/825.44 |
| 5,426,424 | 6/1995 | Vanden Heuvel et al. | 340/825.44 |
| 5,546,077 | 8/1996 | Lipp et al. | 340/825.44 |
| 5,555,183 | 9/1996 | Willard et al. | 340/825.21 |
| 5,705,995 | 1/1998 | Laflin et al. | 340/825.44 |
| 5,886,645 | 3/1999 | Eaton | 340/825.44 |

Primary Examiner—Dwayne D. Bost
Assistant Examiner—Nay Maung
Attorney, Agent, or Firm—Keith A. Chanroo

[57] ABSTRACT

An updateable message encoder/transmitter (100) has a processor (109) for encoding messages and message updates. A message includes an origination time (191), a version number (410) and an update lifetime indicator (424), and a message update includes the origination time (191) and the version number. A transmitter (120) broadcasts the message and the message update message receiver/decoder (130) receives the message and the message update, a processor (212) processes the message to determine when the message update is being received. The processor checks the update lifetime indicator of the message indicated by the message update to determine if the message to which the message update is intended can be updated. A comparator compares the origination time of the message with the origination time of the message update to determine if the message update is an out-of-sequence message update.

17 Claims, 7 Drawing Sheets

SYSTEM AND METHOD FOR INCLUDING ORIGINATION TIME AND UPDATE LIFETIME WITH UPDATEABLE MESSAGES

FIELD OF THE INVENTION

This invention relates in general to communication systems and more specifically to a method for including an origination time and an update lifetime with an original message, and for including an origination time with an update message.

BACKGROUND OF THE INVENTION

A conventional selective call device, e.g., a pager, often can receive messages from more than one source. Sources are distinguished from each other typically by address information associated with each message or information services. When the address information correlates, or matches, a predetermined address in a selective call device, the selective call device receives and stores the message from an information source.

Modern selective call services are capable of sending multiple types of information, for example, stock market, weather, sports, news or other information periodically to a subscribing selective call device (receiver and/or transmitter). Before long, hundreds of information services are likely to be transmitted to selective call devices. With this rapid expansion, the number of services will easily exceed the amount of airtime available on the radio channel. Additionally, there will be a cost associated with the reception of these information services.

In many instances, information services messages are repetitive of a prior information service message but for a relatively small portion of changed or new data. For example, when transmitting stock price information, the stock name, year high and year low information will change much less frequently than the stock's current trading price. As other examples, both sports scores and weather information services messages comprise, in one part, information that is updated on an infrequent basis such as team names or geographic data. Correspondingly, another part of such information services messages comprise information that is frequently updated such as team scores and atmospheric conditions.

In order to reduce airtime, methods and systems of updating information services messages transmit only a predetermined portion of an information service message. The predetermined portion is that portion which frequently changes. A remaining portion, or template, is that portion which seldom changes. However, after a passage of time, typically after one or more days, there occurs a need to make a change within the template or to change the size of the template. This is usually accomplished through the use of a new template message or original message. For example, if the information services subscribed to is sports scores, the name of the teams will usually change once per day, but the scores will usually change many times per day.

Each new template or original message is identified by a version number that changes each time the template or original message changes. Each update message contains the version number of the original message that this particular update messages is intended to update. This version number is limited to a small number so as to minimize airtime required for its transmission. Therefore the version numbers repeat periodically. For example, if a selective call device receives a message with version number N and is then turned off or moves out of the reception area, when the selective call device returns, it may receive an update for message number N. Unfortunately, this may be an update for an entirely different message that is re-using the same version number N. Thus what is needed is a method of determining when updates to a message are no longer valid and to discard such updates so as not to erroneously update a message whose update lifetime has expired.

It is well known to transmit one or more information services sub-messages (updates) embedded within a message of a conventional selective call protocol. It is also well known that selective call systems do not always transmit messages in the order that the messages were submitted to the selective call system; therefore, an embedded information services sub-message will occasionally be received by a selective call device out-of-sequence. A message update that is received out-of-sequence is referred to as an out-of-sequence update. With many information services messages, such as stock prices, or update of a sports score, the sequence of receiving information services sub-messages (updates) is very important because the exact sequence itself conveys important and useful information, such as whether a stock is continually rising in price. With known systems and methods, if an older information services update message is transmitted subsequent to a newer information services update message, the older update will be received and incorrectly represented by a selective call device as a more recent update.

As discussed above, to conserve air-time, information is transmitted as updates which modify or change only selective portions of a message already received by a selective call device. Unfortunately because traffic varies depending on the time of day, there are times when a particular update can be transmitted by the information services system but is not received by the selective call device until after the selective call device has received a later transmitted update. If the selective call device should act upon the latest received update, it would change the information to reflect a "older" version of the news.

Thus, what is needed is a method of determining when an out-of-sequence information update is being received and to discard in favor of the more current information.

DESCRIPTION OF A PREFERRED EMBODIMENT

Figure 1:
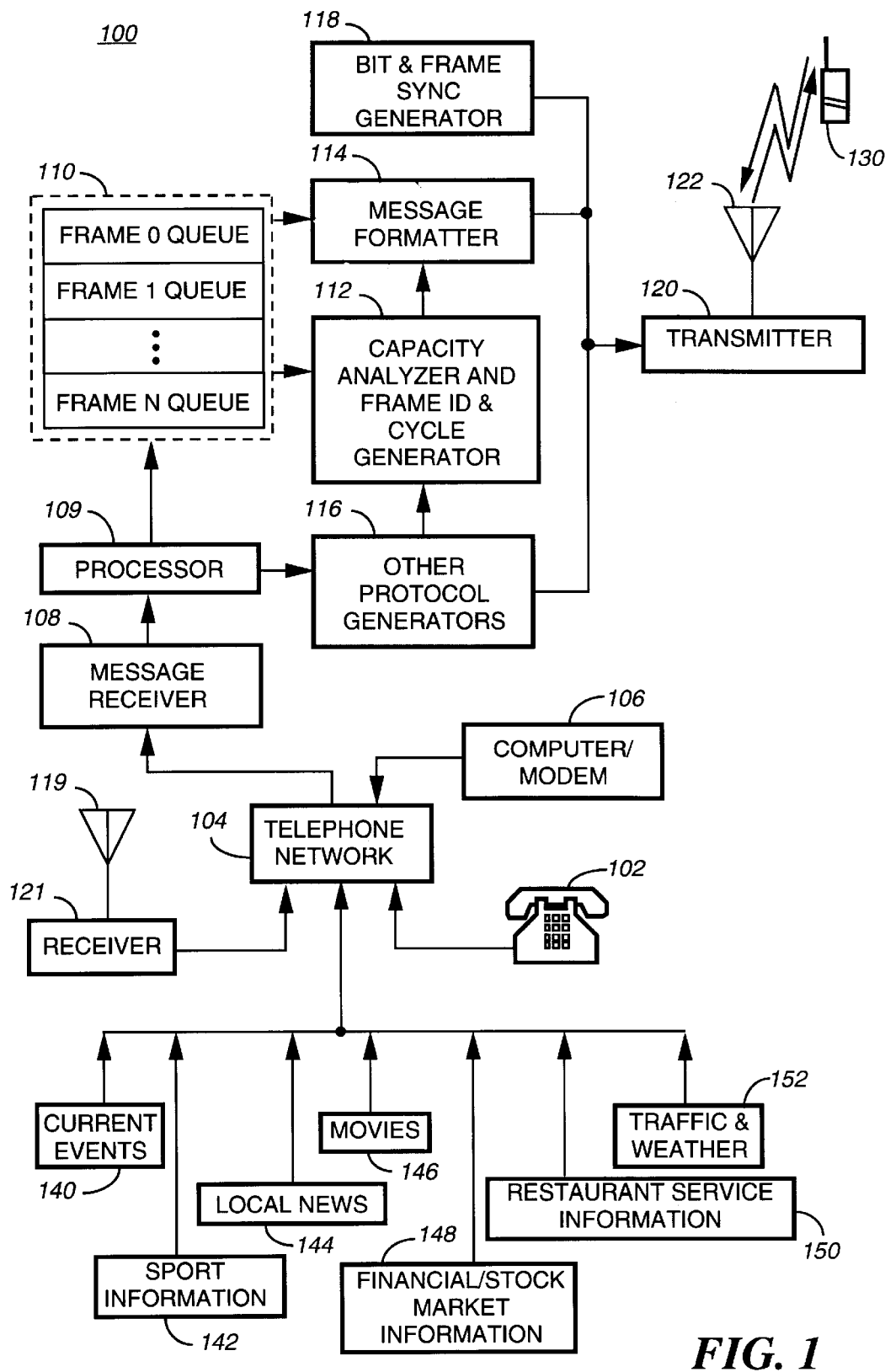
FIG. 1 is an electrical block diagram of a selective call system for providing information services in accordance with a preferred embodiment of the present invention.

FIG. 1 shows an electrical block diagram of a selective call communication system (or radio frequency communication system) for generating and transmitting (e.g., broadcasting) selective call signals (or communication signals) including one or more information services in accordance with a preferred embodiment of the present invention. The functions of the selective call system 100 are preferably implemented within software, for example within a MODAX 500 Selective Call Terminal which is manufactured by Motorola Inc. Typically, a message is sent in response to a user using a telephone 102 to initiate a transmission of a selective call message. As is well known, the telephone 102 couples to the selective call system 100, in particularly a base station or base site via a telephone network 104, e.g., public switch telephone network (PSTN), the operation of which is well known to one of ordinary skill in the art. Similarly, a computer/modem 106 is also coupled to the telephone network 104 to enter information, for example alphanumeric or numeric messages. The telephone network 104 couples to a message receiver 108 which receives the messages to be transmitted (broadcast) to one or more selective call devices 130 typically from the public switched telephone network 104.

According to the preferred embodiment, one or more information services, e.g., 140–152 are coupled either wireline or wireless to the telephone interface network which is coupled to a processor 109 via the message receiver 108. As shown, a receive antenna 119 is coupled to a base station receiver 121 which is coupled to the telephone network 104. Those skilled in the art will appreciate that the plurality of information services 140–152 can be received as radio frequency signal (or, microwave or other similar wireless) by an antenna.

When the base site processor 109 receives the information which are periodically transmitted as updates (modifications or changes to parts of an original template information) that are received as information packets, the processor 109 encodes the information as messages in blocks in the form of selective call signals (or communication signals). Specifically, the processor 109, coupled to the message receiver 108, determines an appropriate protocol, preferably the FLEX™ and/or ReFLEX protocols, and an address to encode with the information services. If the processor 109 determines that the message is to be sent via another signal format, it is passed to one of another protocol generator 116 which can include other protocol generators well known to one of ordinary skill in the art. When the processor has determined that the information services and any messages is to be transmitted on the FLEX protocol, the information are then encoded and stored in a frame queue buffer 110 which has queues (FRAME 0–N QUEUES) for the corresponding frames of the signal, and according to the preferred embodiment of the present invention, the corresponding number of frames N is 128. The predetermined frame identification (ID) of the selective call device 130 corresponding to the message is determined and the message is stored in the corresponding frame queue. A capacity analyzer and frame ID/cycle generator 112 determine the sequence of frame IDs to be transmitted and analyze the capacity of each frame to determine the cycle value to be used. The capacity analyzer 112 is also responsive to other protocols being transmitted. For example, if the expected occurrence of a frame is to be replaced by the transmission of one of the other protocols (thereby diminishing the capacity of the frame), the capacity analyzer 112 can account for this with the determined cycle value. A bit and frame sync generator 118 synchronously generates bit and frame synchronization signals. A message formatter 114 determines, in response to the address of the selective call device 130 and the frame queue, the frame in which the information is to be included. The messages are then formatted for transmission. A transmitter 120 accepts signals from blocks 118, 114 and 116 and modulates and transmits radio frequency selective call signals to selective call devices 130 via antenna 122 in a manner well known to those of ordinary skill in the art. The transmitter 120 preferably transmits information periodically to the selective call devices.

The capacity analyzer and frame ID and cycle generator 112 generate control data in response to the information 140–152 being received. The control data is formatted with the selective call signals to inform the selective call devices 130 the quantity of information that will be transmitted, the rate at which the transmission will sent, and also the frames in which the information will be transmitted. When there is a variation in the amount of information to be sent to the selective call device 130, the selective call communication system encodes control data to indicate any such changes. The selective call device 130 uses this control data to determine the size of a temporary memory or buffer to be created or allocated and the rate for transferring the information to the display to obtain a stream of information display between packets of information. The selective call device 130 also changes or varies the size of the temporary buffer in response to the variation of the information rate being sent by the selective call system.

The processor 109 according to the preferred embodiment of the invention encodes the selective call signals comprising information services with an origination time. The origination time is preferably encoded in Universal Time Coordinated (UTC) and is indicative of the time the message or information is received by the information provider. With the origination time reference to the UTC, there will be no changes required when travel results in the crossing of time zones. It will be appreciated that if the origination time for all information, in particularly information updates, is encoded with the messages, the selective call devices 130 can easily determine when an update is out-of-date or sequence, thus preventing an erroneous update to received information.

Figure 2:
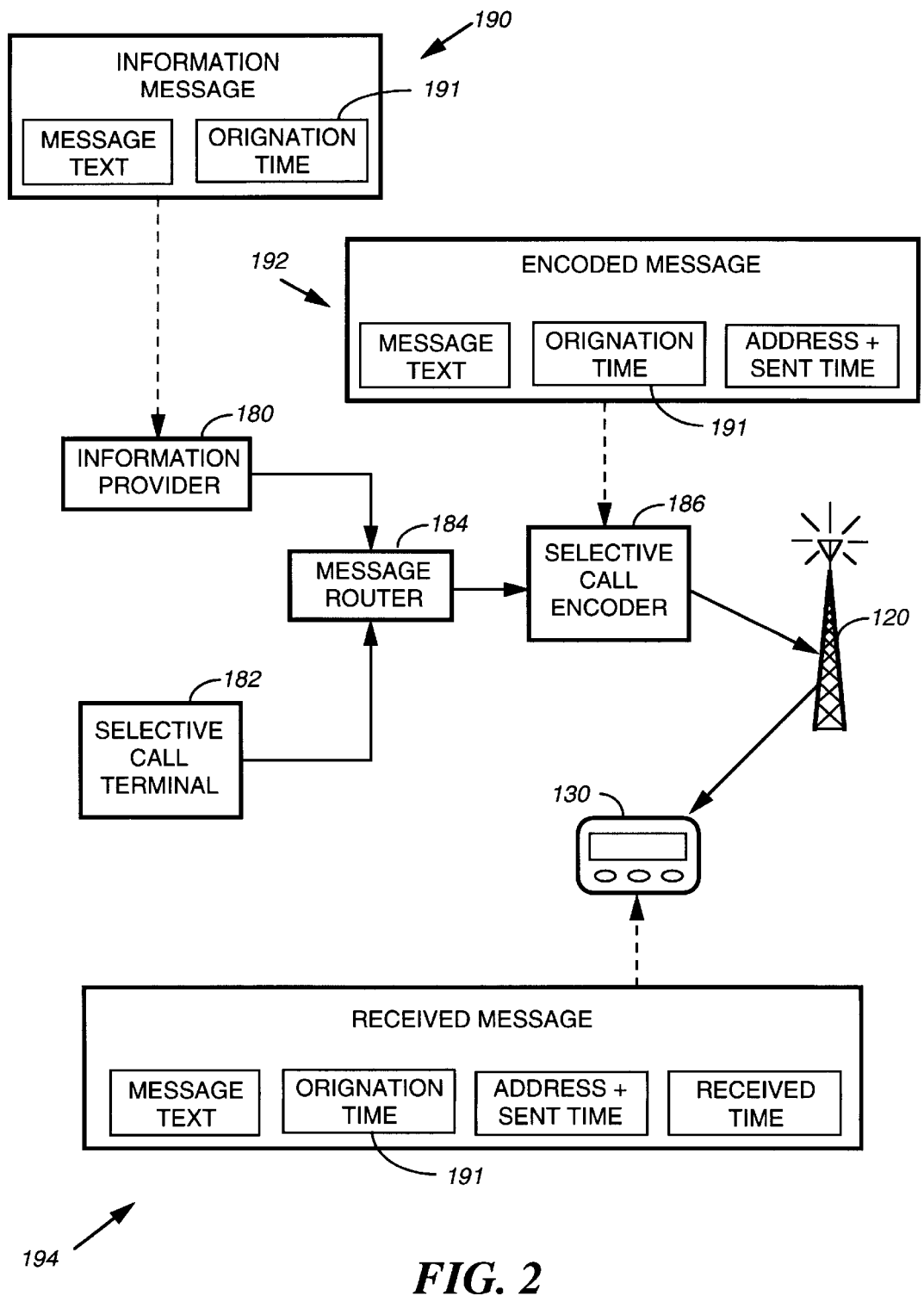
Referring to FIG. 2, an electrical block diagram of information flow from the service provided to a selective call device according to the preferred embodiment of the present invention.

Referring to FIG. 2, an electrical block diagram of information flow from an information service provider to a selective call device according the preferred embodiment of the present invention. As shown, when the message or information services is received by an Information provider 180, an origination time 191 is appended to the message text or information 190 which is then passed to a selective call encoder 186 via a message router 184. It is understood that the origination time can be included with the message either at the information provider 180, the selective call terminal 182 or the selective call encoder 186. While it is not of critical significance where the origination time is added, encoded, appended or included with the message, it is, however, important that the link between the information provider 180 and the selective call terminal 182 or the selective call encoder 186 preserve message order and not introduce delays if the origination time is added, appended, included or encoded at a location other than the information provider 180. A selective call encoder 186 encodes or adds the address plus sent time as shown in the resulting message 192. The message 192 is transmitted by a selective call transmitter 120 to at least one selective call device 130. When the message 194 is received it is encoded with the received time as shown.

Figure 3:
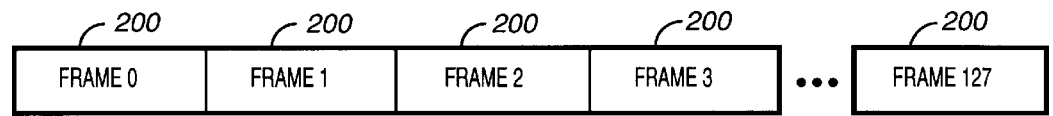
FIGS. 3–6 are timing diagrams illustrating the transmission format of the signaling protocol utilized by the selective call system of FIG. 1 in accordance with the preferred embodiment of the present invention.
Figure 4:
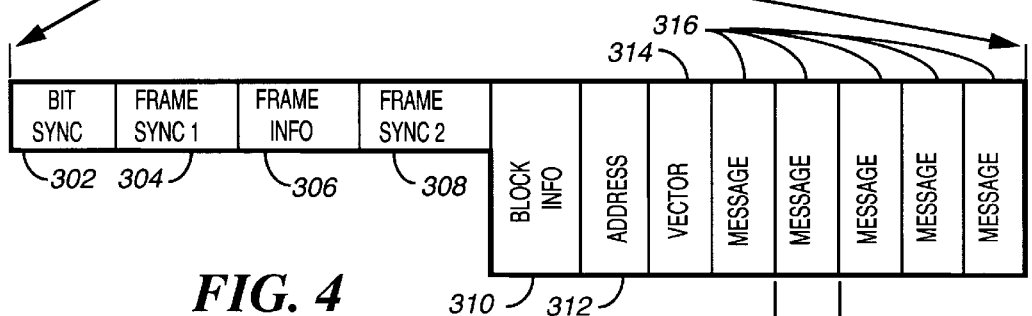
Figure 5:
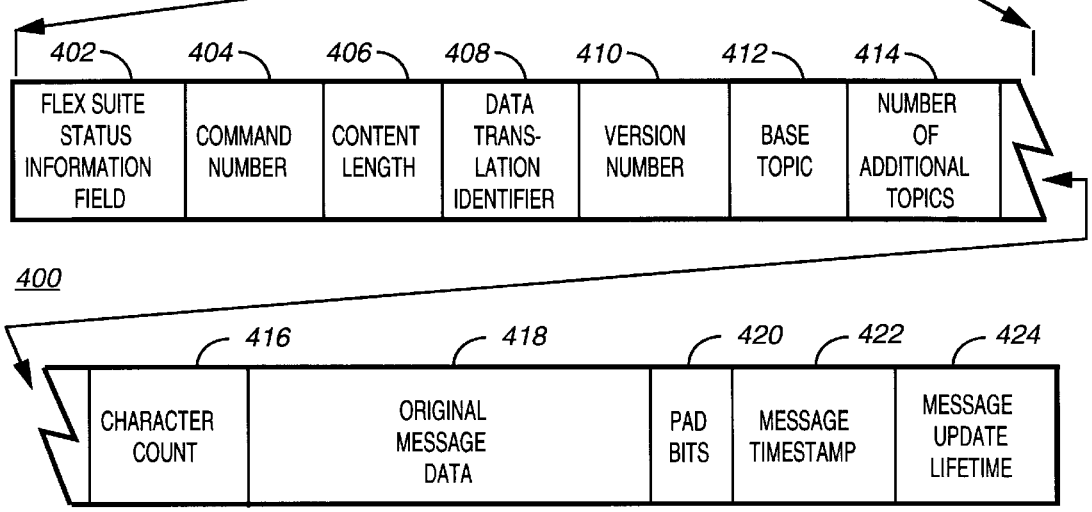

Referring to FIGS. 3–5, timing diagrams of a signaling protocol in accordance with the preferred protocol for selective call messages are shown according to FIG. 1. Referring to FIG. 3, the selective call protocol is encoded, preferably according to the FLEX™ protocol, in a number of preferably one-hundred-twenty-eight (128) message packets or frames 200. Each frame 200 is preferably 1.875 seconds in duration and has a preferred base data rate of 6400 bits-per-second. Therefore, the entire 128 frames, each having a duration of 1.875 second, will take four minutes to transmit. It will be appreciated by one of ordinary skill in the art that other data rates can be used including the ability to use multiple data rates.

Referring to FIG. 4, each frame is comprised of a bit sync signal 302, preferably 32 bits of alternating 1,0 patterns, followed by a FRAME SYNC #1 signal 304 preferably having a predetermined thirty-two bit words and its thirty-two bit inverse, and a FRAME INFO signal 306, preferably one thirty-two bit word having twenty-one variable information bits containing information such as a cycle number and a frame number. The BIT SYNC signal 302 provides bit synchronization to the selective call device(s) 130 while the FRAME SYNC #1 signal 304 provides frame synchronization and includes the control signal indicative of the data rate of the message or information.

Following the FRAME INFO word 306 is a FRAME SYNC #2 308. Following the FRAME SYNC #2 308 is a block info word signal 310 including information such as the number of priority addresses, end of block information field, and vector start field. The code word of each frames 200 is preferably encoded as 31,21 Bose-Chaudhuri-Hocquenghem (BCH) code words having twenty-one information bits and ten parity bits generated according to the well known BCH algorithm. An additional even parity bit extends the word to a 32,21 code word. The addresses are located in block 312 and the vectors pointing to the messages are located in block 314 and the messages are located in the remaining blocks 316. Generally, all of the address signals within the frame are located in a first portion 312 and the information or message signals are located in a subsequent portion of the block 316. It is well known to those skilled in the art how to locate addresses 312 in a first portion and message information 316 in a second portion of the frame 200. Words 310–316 are shown in a vertical orientation to indicate that these words can be interleaved in order to improve the immunity of the transmission to burst errors. It is understood by one of ordinary skill in the art that interleaving can be modified or eliminated.

Referring to FIG. 5, an original message 316 is illustrated in more detail in accordance with the preferred embodiment of the present invention. Information or message data of the information services 140–152 are encoded in one of the messages 316 for transmission to the selective call devices 130. There are various methods and levels of communication passed to selective call devices 130 from a selective call system 100, and a procedure is needed to identify which application-layer, or embedded, protocol was used by an information services 140–152 to encode the information content contained in such transfers. A Status Information Field 402 identifies that an embedded protocol message, preferably a FLEX suite embedded protocol message, as opposed to a regular selective call message, is being transmitted. The term "embedded protocol" refers to an application-layer communication protocol carried by a transport-layer communication protocol. FLEX suite comprises several embedded protocols used to transfer applications, e.g., computer programs, and data for use by such applications, over a selective call system 100 that uses the FLEX protocol. The FLEX suite status information field 402 identifies that the following messages or information are from an information services provider which is to be broadcast to one or more selective call devices 130. When a transmission channel has limited capacity, it is advantageous to use a radio frequency-based embedded protocol, such as one of the FLEX suite protocols or FLEXinfo™ information services protocol 400, rather than one of the more feature-rich, wireline based, prior art protocols. The Status Information Field 402 defines which method is used for transferring information to a selective call device from the selective call system 100. The Status Information Field 402 is defined as the first eight bits of application-layer information in a FLEX suite embedded protocol message. It should be understood that a message 316 can comprise one or more FLEX suite embedded protocol messages, or sub-message, in which case, each of the one or more embedded protocol messages has a separate Status Information Field 402. The purpose of the Status Information Field 402 is to provide to the controller 210 (FIG. 7) the information needed by the software of the selective call device 130 to correctly process the information content of the associated message field that immediately follows the Status Information Field.

The Status Information Field 402 comprises an application-layer protocol identifier, preferably represented by two hexadecimal digits. Preferably, the application-layer protocol is FLEXinfo and the application-layer protocol identifier for FLEXinfo is preferably "80". As can be appreciated, the Status Information Field is the first portion of the message 316.

The FLEX information services protocol 400 is a sequential command protocol. Each FLEX information services protocol 400 command has a command identifier or number 404 followed by a content length 406 and the data translation identifier 408. It is understood that multiple commands can be included in one FLEX information services message. A selective call device 130 receives an original information services message through the use of a FLEXinfo Original Message Command or other means. It should be understood that an information services provider computer 180 (FIG. 2), preferably located at each provider of the information services 140–152, is programmed to construct original messages using the Original Message Command. Every Original Message Command is transmitted with a Version Number 410. The information services provider computer sets the value of the Version Number. The actual value of the Version Number is arbitrary, but for purposes of more easily understanding the invention, it shall be assumed that a first Original Message Number has a Version Number of zero. For subsequent, different Original Message Commands addressed to a particular selective call device 130, the information services provider computer increments the Version Number by one. Notwithstanding the foregoing, one or more one original message commands can be sent to a particular selective call device 130 to ensure receipt by the selective call device of an Original Message Command. In which case, the selective call device 130 utilizes the first command it successfully receives or the command it receives with the fewest errors.

Figure 7:
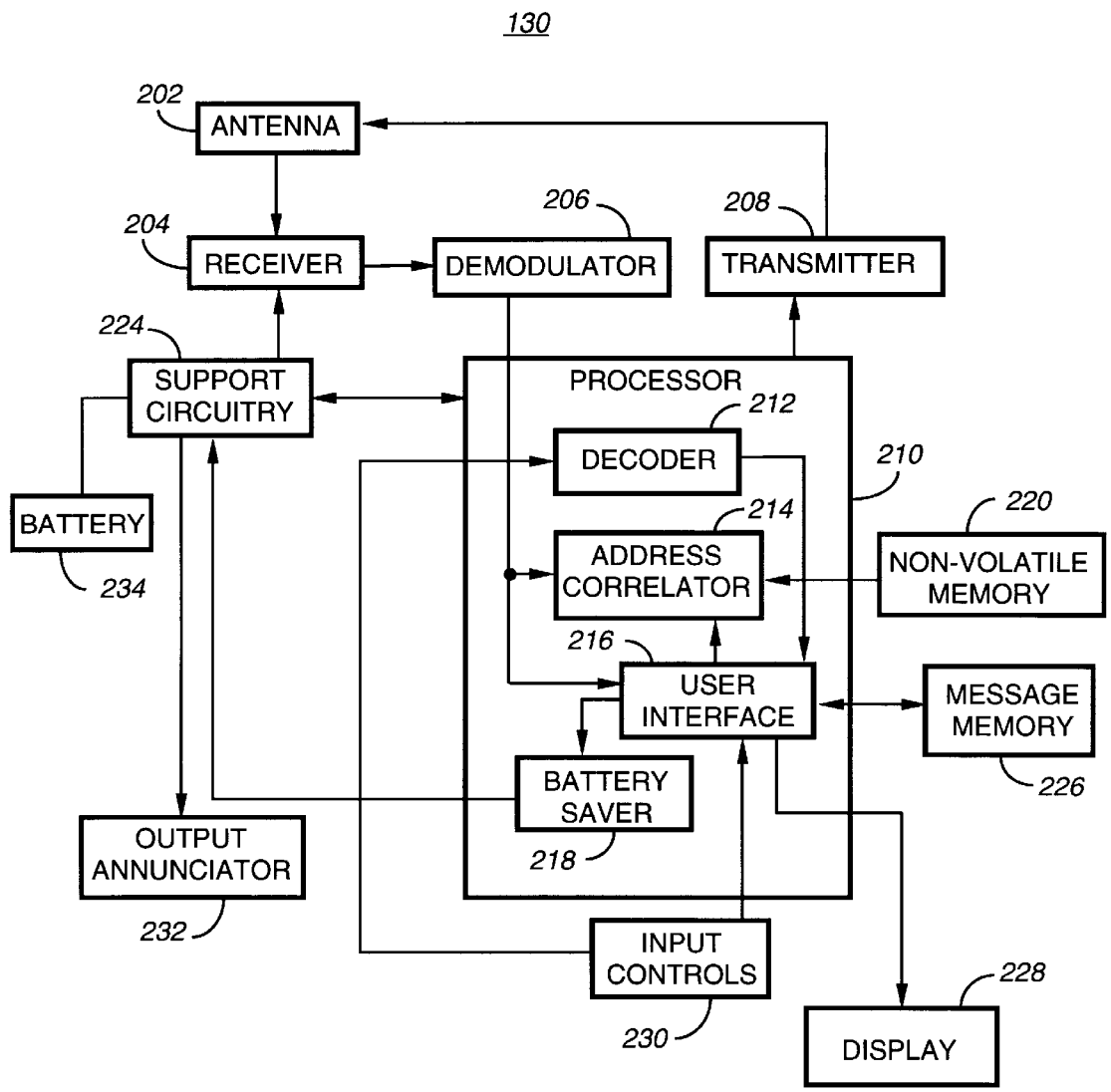
FIG. 7 is an electrical block diagram of a selective call device in accordance with the preferred embodiment of the present invention.

As discussed, following the FLEX suite Status Information Field 402, each FLEXinfo command has a unique Command Identifier 404. The Command Identifier 404 is preferably an expandable unsigned integer. A Content Length 406 specifies the size of the Sequential Topic Range original message command, i.e., it specifies the number of bytes from block 408 through block 424, inclusive. The next field is a Data Translation Identifier 408. The Data Translation Identifier 408 is preferably four bits in length and identifies which of several data translation algorithms, such as ASCII or Numeric, was used to encode the associated data. Although ASCII is the preferred data translation algorithm when sending an original message to a selective call device 130, updates are preferably sent using a numeric data translation algorithm, such as Standard Numeric or Financial Numeric. Updates and information are transmitted in any of the popular four-bit numeric, seven and eight-bit alphanumeric, and eight-bit hexadecimal formats producing the most tightly packed data. Through the use of the Data Translation Identifier 408, the selective call device 130 can properly convert the message to the format in which the message is stored in a memory element, such as message memory 226 (FIG. 7).

After the Data Translation Identifier 408, there is a Version Number 410 having a size, or length, of four bits, thereby allowing up to sixteen different Version Numbers. The Version Number 410 is used to verify that an update or message is valid for an existing sub-message. There is one Version Number in a FLEXinfo command. If a value of the Version Number 410 of an update command does not match a value of the Version Number stored in the selective call device 130 for the topic(s) included in the update command, then none of the update data in the update command is used to update information displayed on the selective call device. It should be pointed out that all Topics included in a single update command share the same one Version Number because the Version Number is associated with a sub-message template and all sub-addresses, or Topics, within a single FLEXinfo command share a same sub-message template. Provision of the Version Number 410 forces the selective call device 130 to receive a new original message before any updates are displayed, thereby eliminating false or misleading reports.

The selective call device 130 derives the range of the information topics from a Base Topic 412, which designates the beginning sub-addresses that will be transmitted, and from a Number of Additional Topics 414, which defines a number N of additional topics after the Base Topic 412 to which the command is applied. For example, if the beginning topic number is ninety-eight, then the hexadecimal value "62" appears in the field for Base Topic 412. For example, if the total number of information services topics is seven, then the hexadecimal value "06" appears in the field for Number of Additional Topics 414. Unlike known methods which use sub-addresses of a pre-determined length, the Base Topic 412 and the Number of Additional Topics 414 are advantageously unsigned expandable integers. A byte expansion flag in the most significant position of an expandable integer field indicates whether the expandable integer extends over more than one byte. Each topic has a unique integer associated therewith. By designating the topic sub-address in a sequential manner, e.g., either in ascending or descending order with unique integers, the beginning topic sub-address and the ending topic sub-address identify the possible information services updates that are included within a given transmission. When the topic sub-address range does not include any topic sub-addresses of the information services to which the selective call device 130 is subscribed, the selective call device can skip to the next command (if there is another command) or can immediately shutdown, i.e., battery save.

A Character Count 416 indicates the total number of characters to the end of the message or information data. The message or information is encoded in the original message data 418 followed by pad bits 420 which are used to fill the remaining portion of the block. A Message Timestamp block 422 is encoded with the origination time 191 and a Message Update Lifetime block 424 is encoded with an update lifetime indicator. The update lifetime indicator 424 specifies the time period in which an original message can be updated by message updates. It is generally set as a constant value and according to the preferred embodiment, the default update lifetime indicator is a predetermined time of 255 hours, which indicates that an original message template can be updated until the predetermined time period of 255 hours has expired. When an update lifetime indicator expires, the selective call device has the option to delete the message to recover message memory. Those skilled in the art understand that the update lifetime indicator or value can be modified according to the application to any suitable value as needed. Only one timestamp or origination time and one update lifetime indicator 424 are shown, but those skilled in the art will understand that more than one can be encoded in the protocol. It is feasible to encode one origination time stamp and one update lifetime indicator with each message if more than one messages are included.

Figure 6:
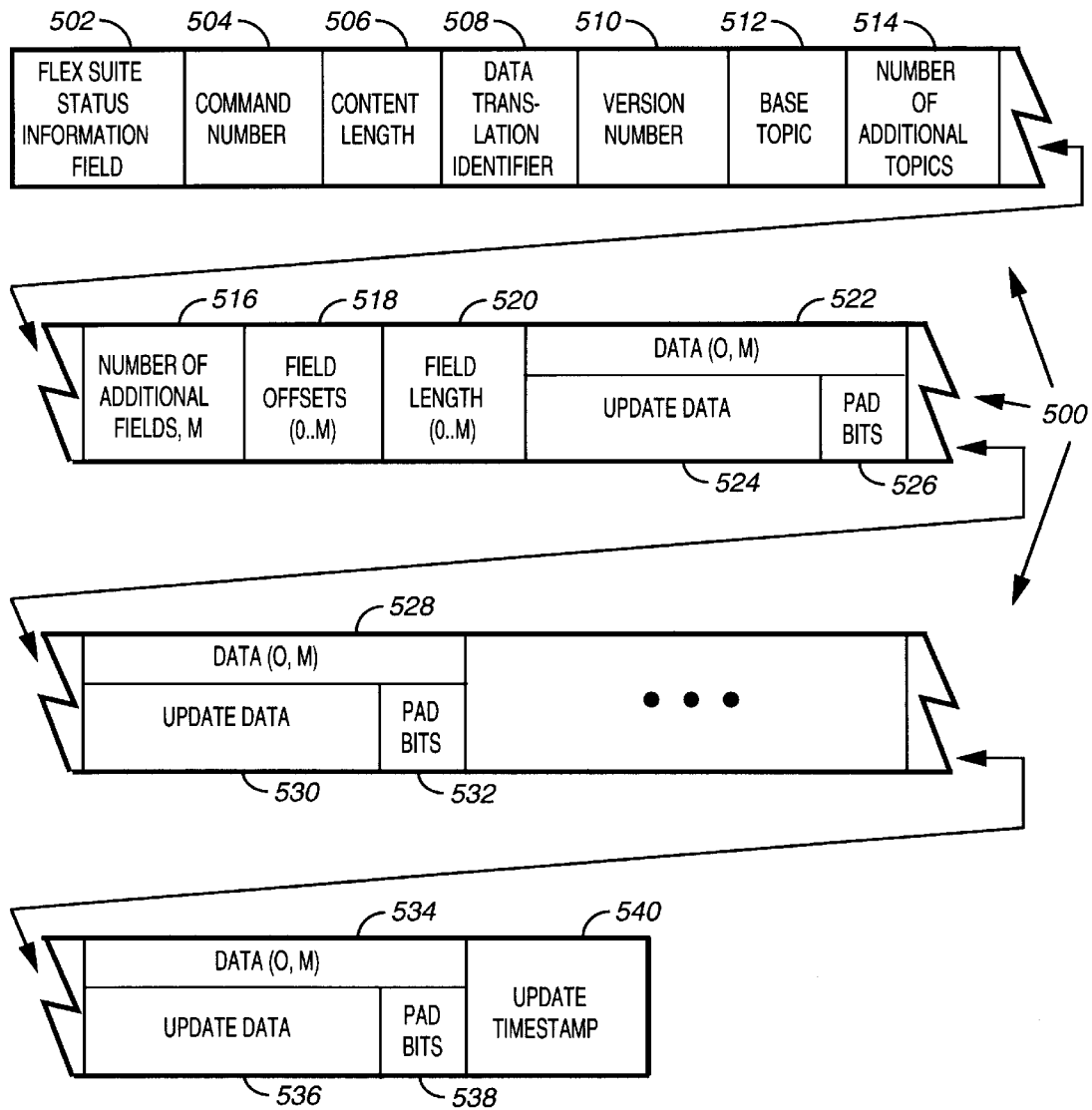

Referring now to FIG. 6, an update message format which changes part of an original message format (FIG. 5) is illustrated according to the preferred embodiment of the present invention. Updates to previously received information services messages are accomplished through the use of one of two types of update commands that allow selected portions, or fields, of an original message to be efficiently updated with minimal overhead. The FLEX suite Status Information Field 502 is similar to that of FIG. 5. The command number 504 is encoded with the command indicating that the message being transmitted comprises message updates to an original message or information. A Content Length 506 specifies the size of the Sequential Topic Range Update Command 500, i.e., it specifies the number of bytes from block 508 through block 540, inclusive. The next field in the Sequential Topic Range Update Command 500 is a Data Translation Identifier 508. The Data Translation Identifier 508 is preferably four bits in length. The Data Translation Identifier 508 identifies which of several data translation algorithms, such as ASCII or Numeric, was used to encode the associated data in the Sequential Topic Range Update Command 500. After the Data Translation Identifier 508, there is a Version Number 510, Base Topic 512 field, a Number of Additional Topics 514 similar to FIG. 5. A Number of Additional Fields 516 parameter defines a number M of additional fields to update. The Topic List Update Command 500 also comprises a Field Offsets 518 array of M+1 parameters. The Field Offsets 518 are an array of expandable unsigned integers that define, for each field in a topic, offsets to the first character of the field. The first field offset, Field Offset (0), is defined as the number of characters from the first character of the message. In the event the Data Translation Identifier 508 designates hexadecimal format, then the first field offset is defined as the number of bytes from the first character of the message. The second field offset, Field Offset (1), and all subsequent offsets to Field Offset (M), are defined as the number of characters (or bytes for hexadecimal format) from the character following the previous updated field in the message. The Sequential Topic Range Update Command 500 also comprises a Field Lengths 520 array of M+1 expandable unsigned integers that define a field length, in number of characters, for each of the fields that are to be updated. The Sequential Topic Range Update Command 500 also comprises an array of data strings, [Data(0,0), Data(0,1), Data (0,2) . . . Data(0,M), Pad Bits, Data(1,0), Data(1,1), Data (1,2) . . . Data(1,M), Pad Bits . . . Data(N,0), Data(N,1), Data(N,2) . . . Data(N,M), Pad Bits] 522, 528, 534 immediately following the array of Field Lengths 520. The first entry in the array of data strings 522, Data (0,0), represents the updated information for the first field, i.e., Field Offset (0), of the Base Topic, e.g., Topic (0). The second entry 528 in the array of data strings, Data (0,1), represents the updated information for the second field, i.e., Field Offset (1), of the Base Topic, e.g., Topic (0). In the example given above, the Base Topic is topic number "98". Each of the data string, 522, 528, 534 includes the update data 524, 530, 536 and the pad bits 526, 532, 538, respectively. An update timestamp 540 is included with the update information to designate the origination time of the update. According to the preferred embodiment, the update timestamp prevents the selective call device from incorrectly updating an original message with an out-of-sequence update. Therefore, when a message update is received with a earlier origination time than the origination time of the last received update (or of the original message if this is the first received update), the message will not be updated.

FIG. 7 shows an electrical block diagram of a selective call device according to the preferred embodiment of the present invention. The selective call device (e.g., transceiver or receiver) 130 is powered by a battery 234 and operates to receive and to transmit radio frequency signals via an antenna 202. A receiver 204 is coupled to the antenna 202 to receive the radio frequency signals. A demodulator 206 is coupled to the receiver 204 to recover any information signal present in the radio frequency signals using conventional techniques. The recovered information signal from the demodulator 206 is coupled to a controller or processor 210 that decodes the recovered information in a manner well known to those skilled in the art.

In the preferred embodiment, the controller or processor 210 comprises a microcomputer, such as a Motorola, Inc. manufactured microcomputer, e.g., 68FLC11K4 or MC68HC11PH8, and has or comprises a signal processor performing the functions of a decoder which is normally implemented in both hardware and software. The signal processor comprises an address correlator 214 and a decoder 212, using methods and techniques known to those skilled in the art. The signal processor includes a comparator for comparing the origination time of the message with the origination time of the message update to determine if the message is an out-of-sequence message update. The address correlator 214 checks the recovered information signal from the output of the demodulator 206 for address information and correlates a recovered address information with one of a plurality of predetermined address information that are stored in the selective call device's nonvolatile memory 220. After the address correlator 214 determines that the received signal is directed to the selective call device 130, e.g., by correlating the address in the received signal to one of the predetermined addresses in the memory 220, the decoder 212 decodes the signal for, e.g., a Status Information Field 402/502 to determine if the message contains FLEX suite information services data, either in the form of an original message template or an update to a previously received message as discussed above.

When the user of the selective call device 130 has subscribed to or is able to receive at least one information services, it receives original messages and updates which are stored in message memory 226. The selective call system encodes and transmits control data to the selective call device 130 indicating the amount of information that will be received and the periodic rate at which the information will be transmitted. The selective call system also informs the selective call devices 130 the frames (frame numbers) in which the information will be transmitted and the amount of information that will be transmitted in each frame. From this information, the selective call device 130 is able to determine an appropriate data rate of the information.

When the selective call device 130 receives and decodes the information services as designated, e.g., by the Status Information Field 402/502, the decoder 212 decodes the timestamp 422 for an original message (FIG. 5) or the timestamp 540 (FIG. 6) for an update to the original message as discussed above. The timestamp 422 contains an origination time of the message which indicates when the message was received by the information provider. The original message also contains an update lifetime 424 (FIG. 5) time or reference which represents the length of time, e.g., 255 hours, that the original message can be updated by subsequently received message updates. The selective call device detects the expiration of the update lifetime, and can delete the message with an expired update lifetime indicator. Each message update of FIG. 6 contains an update timestamp 540 which is used by the decoder 212 to determine if the message update in reference to the original message and any previous updates to the original message were received in sequence. A display 228 is coupled to the processor 210 via a user interface 216 to display the message data, e.g., a liquid crystal display. An alert is presented to the user via an output annunciator 232. The alert can include an audible alert, a visual alert, a vibratory or silent alert, or a combination of the aforementioned alerts, using known methods and techniques.

Support circuitry 224 preferably comprises a conventional signal multiplexing integrated circuit, a voltage regulator and control mechanism, a current regulator and control mechanism, audio power amplifier circuitry, control interface circuitry, display illumination circuitry, and input control 230 via the user interface 216. These elements are arranged to provide support for the functions of the selective call device 130 as requested by a user.

Additionally, the processor 210 determines, as is well known, when to conserve power upon failure to detect address information. That is, when a received and recovered address information does not correlate with a predetermined address in the non-volatile memory 220, the processor 210 disables battery power via the support circuitry 224. Specifically, the battery saver 218 signals the support circuit 224 to enter a low power mode (battery save mode). A number of power consuming circuits are directed to a low power or standby mode of operation. Additionally, the signal from the battery saver 218 signals or strobes the receiver circuitry 204 to a low power mode to conserve power. The battery saver 218 will re-enable the receiver and other circuits at some later time. Methods of power conservation strobing in selective call devices are known to those skilled in the art. Further, the controller or processor 210 inhibits any alerts to the user via the output annunciator 232. By not alerting again, power conservation is maximized. A transmitter 208 enables the selective call device 130 to transmit messages or control information as is well known in the art.

In this way, the selective call device 130 receives an original message with a message timestamp 422 and an update lifetime 424 time which are used to indicate the origination time of the message and how long the message can be updated by subsequently received message updates, respectively. The expiration of the update lifetime can be used by the selective call device to delete the messages with the expired update lifetime. A subsequently received message update similarly contains an update timestamp 540 to indicate the birth of the update. Upon the receipt of the update, the selective call device determines if the original message is valid for an update and then determines via its update timestamp 540 if the update was received in sequence. The selective call device, e.g., records the origination time of the last update, if any, and compares that with the origination time of the current update to determine if the current update is not out of sequence.

Figure 8:
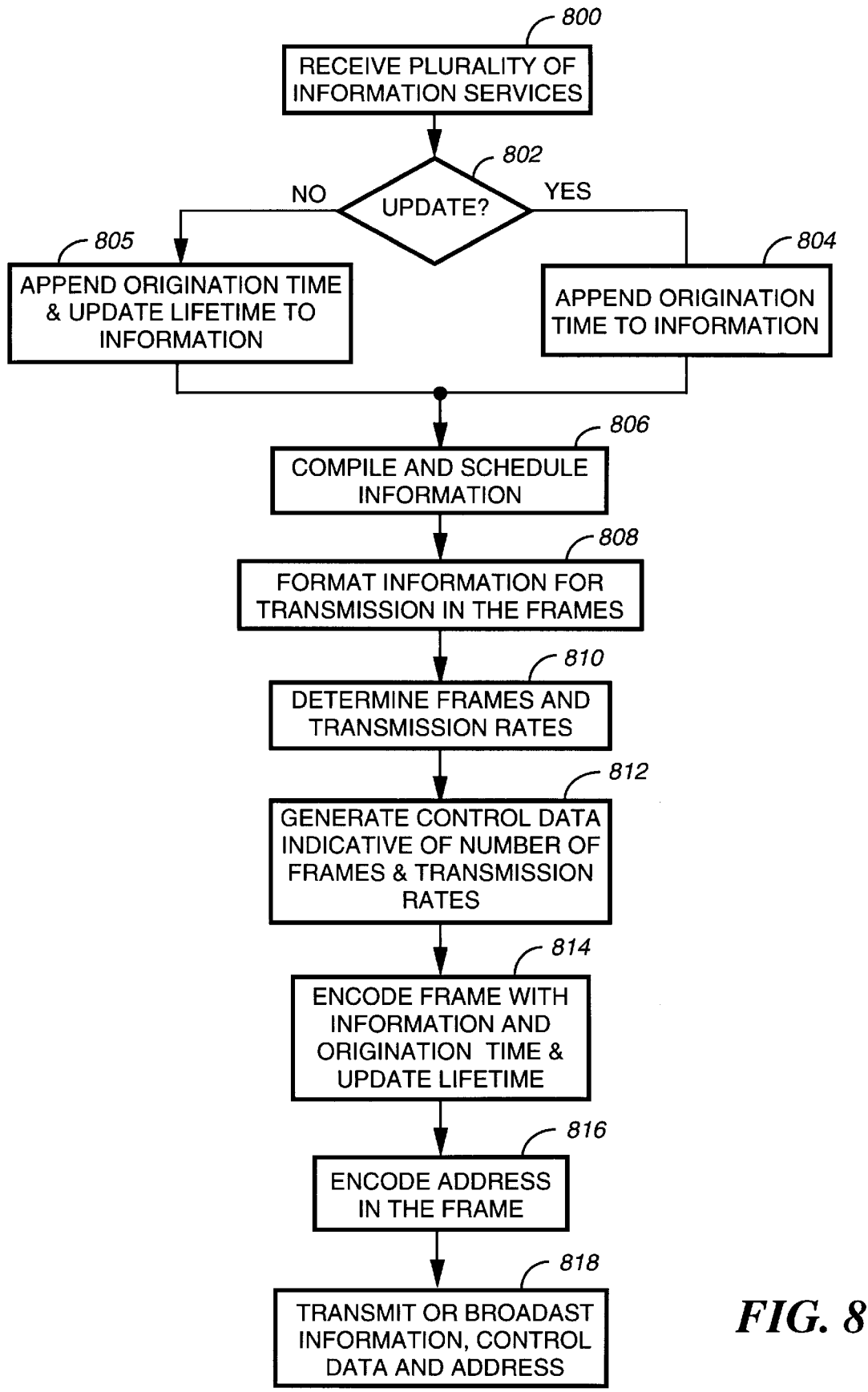
FIG. 8 is a flow diagram of the selective call system of FIG. 1 illustrating the steps of receiving and broadcasting an information service.

Referring to FIG. 8, a flow diagram of the selective call system of FIG. 1 is shown illustrating the steps of receiving and broadcasting information to at least one selective call device. The plurality of information services 140–152 are provided to the selective call system, step 800, and the processor checks if an original message or an update is being received, step 802. If an original message is being received, step 802, the message origination time and update lifetime are appended or included with the message or the information, step 805. On the other hand, if the information is an update to a message template, step 802, then only the origination time is appended to the information, step 804. The information is compiled and scheduled for transmission, step 806. Most information sources, e.g., Cable Network News (CNN) or The Weather Channel, send a text feed to a central location which is responsible for compiling, tagging, and timing the feed for distribution to the selective call system or network. By timing the distribution by topic, subscribers know when to expect specific information themes. For example, a user can tune in at every quarter of the hour (e.g., 15 minutes, 30 minutes, 45 minutes, and on the hour) and expect to get the local weather forecast. The information is formatted by techniques well known to one skilled in the art, step 808. The selective call system receives the information which is compiled and batched as a segment or frame for transmission. The segment length is arbitrary and can be chosen to suit the system load and information latency specifications. Spots can be left for local news or announcements which the local selective call provider or carrier can input into the information. The information segments should be long enough in length to provide the user with a flow information as the selective call device displays the information to the user. Each frame in which information will be encoded along with the transmission or broadcast rate are determined, step 810. The processor determines and generates the control data to be included in the frames to inform the selective call device the rate and the frames in which the information will be broadcast, step 812. The information, the origination time and the update lifetime (in the case of an original message) are encoded in the frames with the control data, step 814. The information encoded with the origination time and update lifetime can be encoded for one or more messages designated for one or more selective call devices. If the frames are reserved, the frame numbers either remain constant or each frame can indicate the next frame to receive the next information segment. The frames are encoded with the address, step 816 and then the information, control data, the origination time, the update lifetime (in the case of an original message) and address are broadcast or transmitted, step 818.

Figure 9:
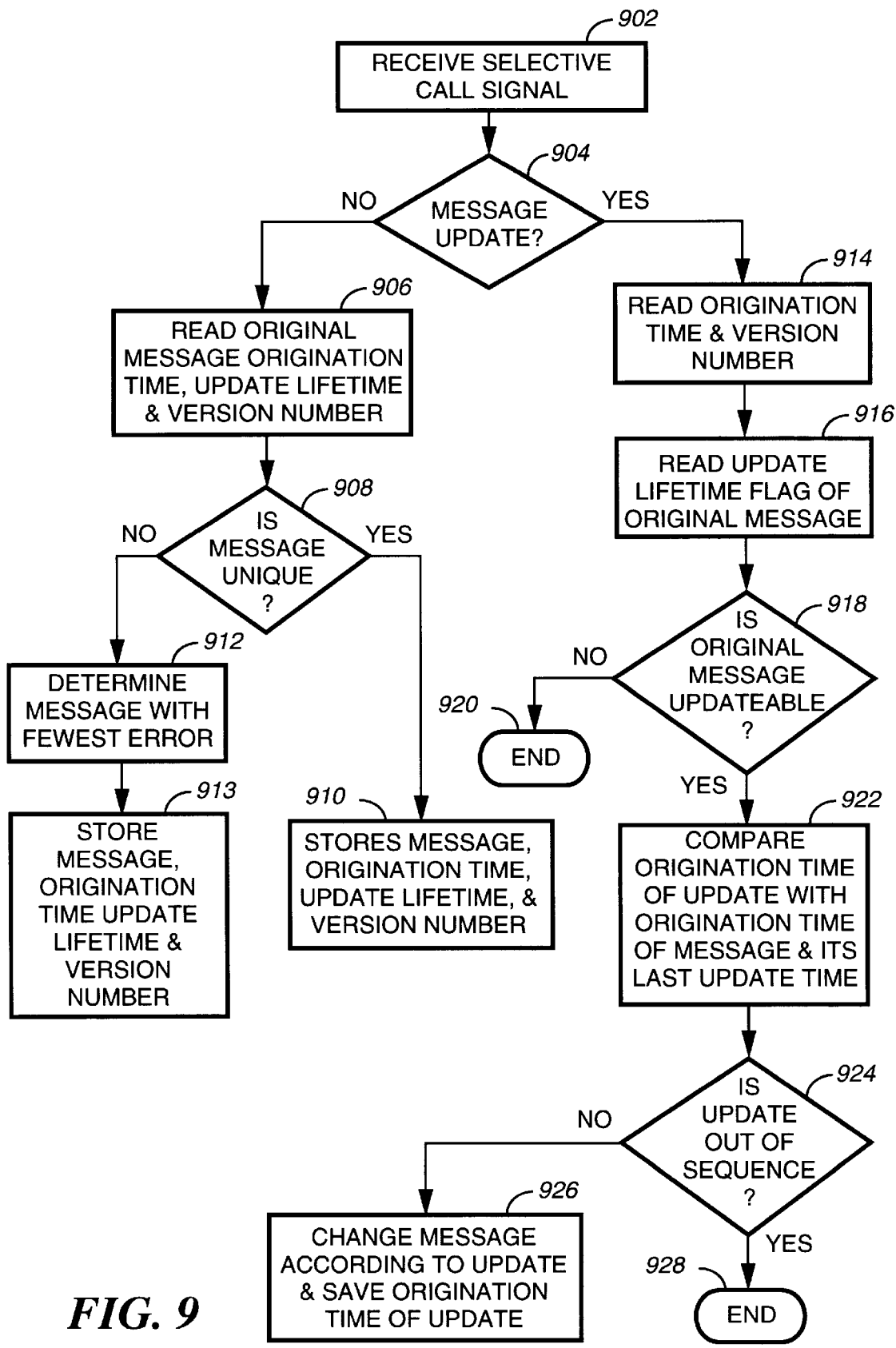
FIG. 9 is a flow diagram of the selective call device of FIG. 7 illustrating the steps of receiving an information service.

Referring to FIG. 9, a flow diagram of the selective call device of FIG. 7 is shown illustrating the steps of receiving information and updates including the origination time of the messages and updates. When the message or information is received, step 902, the processor determines if an original message information or update to an original message is being received by checking the command number or identifier of the FLEX suite information services, step 904. If the message is the original message type, the processor reads at least the origination time, the update lifetime, the version number and the message data or template, step 906. The processor checks the version number and the time stamp of the message to determine if this is a unique original message, e.g., no duplicate version numbers, step 908. If the original message is not unique, the message error in the newly received message is compared with the error in the already received message to determined which message has the fewer number errors, step 912. The message with the fewer number of error is stored with its origination time, the update lifetime values or indicators, and version number, step 913. On the other hand, if the message is unique, step 908, the message is stored with the origination time, the update lifetime values, and version number, step 910.

Returning to step 904, if the message or information is an update to an original message, the processor reads and stores the origination time of the update and its version number, step 914, and checks the update lifetime value of the original message that is indicated (or pointed to) by the update message to determine if the original message is updateable, step 916. If the update lifetime value which was set to 255 hours has expired, then the original message can not be updated (it is not updateable), step 918, and the process ends, step 920. On the other hand, when the original message is updateable, step 918, the processor compares the origination time of the original message (or the origination time of the update that last updated the message) with the origination time of the current message update to determine if the update message is in-sequence, step 922. The processor checks if the message update is out-of-sequence, step 924. If the origination time of the current message update is later than the origination time of the message update that previously updated the original message, step 922, the original message is updated, step 926. Alternatively, if the origination time of the current message update is earlier than the origination time of the message update that previously updated the original message, step 924, the original message is not changed or modified because it is an out-of-sequence update, step 928.

In addition to information services broadcast applications, these same capabilities are also applicable to form-based client/server database applications where only the database fields that change are transmitted to save airtime. Updated field data can be sent from a server to a client application on a pager, or updated field data can be sent to a server from a client application on a two-way pager. Methods are needed to prevent updating the wrong database form or overwriting more current field data with older field data.

In other situations, it is desirable that conventional personal selective call messages be received in the exact order they were originated. For example if a "buy" message was quickly followed by a "sell" message and the two messages were received in the reverse order they would have the opposite of the intended effect. With known systems and methods, message order is preserved between the selective call system and the selective call device, provided the messages were sent to the selective call system in order.

In summary, in a selective call communication system providing updateable messages and message updates to one or more message receiver/decoders, a method comprises: the steps of: encoding messages and updates to messages forming message updates, the step of encoding encodes a message with an origination time, a version number and an update lifetime indicator and a message update with the origination time and the version number, and transmitting updateable message and the message update to one or more message receivers. In a message receiver, the method comprises the steps of: receiving the message and the message update, processing the message to determine when the message update is being received, checking the update lifetime indicator of the message designated by the message update to determine if the message to which the message update is intended can be updated, and comparing the origination time of the message with the origination time of the message update to determine when the message update is an out-of-sequence message update. The step of comparing compares the origination time of the message update with the origination time of the message (or the origination time of the update that last updated the message) to determine if the message update has a later origination time. The step of checking checks the update lifetime indicator to determine if a predetermined time has expired indicating that the message can not be updated by subsequently received message updates. The step of processing includes a step of updating the message with the message update and storing the origination time of the message update to compare with subsequently received message updates to determine if the subsequently received message updates are out-of-sequence.

We claim:

1. In a selective call communication system for providing updateable messages and message updates to one or more messages for one or more message receiver/decoders, a method comprising the steps of:

encoding messages and updates to messages, the step of encoding encodes a message with an origination time, a version number and an update lifetime indicator and a message update with the origination time and the version number;

transmitting the message and the message update to one or more message receivers, in a message receiver, the method comprises the steps of:

receiving the message and the message update;

processing the message to determine when the message update is being received;

checking the update lifetime indicator of the message to determine if the message to which the message update is intended can be updated; and comparing the origination time of the message with the origination time of the message update to determine when the message update is an out-of-sequence message update.

2. The method according to claim 1 wherein the step of comparing compares the origination time of the message update with the origination time of the message to determine if the message update has a later origination time.

3. The method according to claim 1 wherein the step of checking checks the update lifetime indicator to determine if a predetermined time has expired indicating that the message can not be updated by subsequently received message updates.

4. The method according to claim 1 wherein the step of processing includes a step of updating the message with the message update and storing the origination time of the message update to compare with subsequently received message updates to determine if subsequently received message updates are out-of-sequence.

5. The method according to claim 1 wherein the step of checking further comprises a step of deleting a message in response to an expiration of the update lifetime indicator.

6. In an updateable message decoder/receiver, a method comprising the step of:

receiving a message and a message update, the message being encoded with an origination time, an update lifetime indicator and a version number and the message update being encoded with the origination time and the version number;

processing messages to determine when the message update is being received;

checking the update lifetime indicator of the message to determine if the message to which the message update is intended can be updated; and comparing the origination time of the message with the origination time of the message update to determine if the message is an out-of-sequence message update.

7. The method according to claim 6 wherein the step of comparing further includes a step of determining if the origination time of the message update is later than the origination time of the message.

8. The method according to claim 6 wherein the step of checking checks the update lifetime indicator to determine if a predetermined time has expired indicating that the message can not be updated by subsequently received message updates.

9. The method according to claim 6 wherein the step of processing includes a step of updating the message with the message update and storing the origination time of the message update to compare with subsequently received message updates to determine if a subsequently received message update is out-of-sequence.

10. The method according to claim 6 further comprises the step of activating a display for displaying the messages and updated messages.

11. The method according to claim 6 wherein the step of checking further comprises a step of deleting a message in response to an expiration of the update lifetime indicator.

12. An updateable message encoder/transmitter, comprising:

a processor for encoding messages and updates to messages forming message updates, a message includes an origination time, a version number and an update lifetime indicator, and a message update includes the origination time and the version number;

a transmitter for broadcasting the message and the message update to a message receiver/decoder, the message receiver/decoder, comprising:

a receiver for receiving the message and the message update;

a processor for processing the message to determine when the message update is being received, the processor checks the update lifetime indicator of the message indicated by the message update to determine if the message to which the message update is intended can be updated; and a comparator for comparing the origination time of the message with the origination time of the message update to determine if the message update is an out-of-sequence message update.

13. The updateable message encoder/transmitter according to claim 12 wherein the processor encodes a message comprising updateable messages, address assignments, and time periods for the updateable messages.

14. The updateable message encoder/transmitter according to claim 12 wherein the processor deletes a message in response to an expiration of the update lifetime indicator.

15. An updateable message decoder/receiver, comprising:

a receiver for receiving a message and a message update, the message is encoded with an origination time, an update lifetime indicator and a version number, and the message update is encoded with the origination time and the version number;

a processor for processing the message to determine when the message update is being received, the processor checks the update lifetime indicator of the message indicated by the message update to determine if the message to which the message update is intended can be updated; and a comparator for comparing the origination time of the message with the origination time of the message update to determine if the message is an out-of-sequence message update.

16. The updateable message decoder/receiver according to claim 15 further comprises a controller that activates a display for displaying the messages and updated messages.

17. The updateable message decoder/receiver according to claim 15 wherein the processor deletes a message in response to an expiration of the update lifetime indicator.

* * * * *